(12) United States Patent
Jiang et al.

(10) Patent No.: US 11,437,715 B2
(45) Date of Patent: Sep. 6, 2022

(54) HIGH-GAIN MINIATURIZED ANTENNA ELEMENT AND ANTENNA

(71) Applicants: ROSENBERGER TECHNOLOGIES CO., LTD., Suzhou (CN); Rosenberger Technologies LLC, Budd Lake, NJ (US)

(72) Inventors: Tao Jiang, Suzhou (CN); Peng Liu, Suzhou (CN); Dele Wang, Suzhou (CN); Jing Sun, Suzhou (CN)

(73) Assignees: ROSENBERGER TECHNOLOGIES CO., LTD., Suzhou (CN); ROSENBERGER TECHNOLOGIES LLC, Budd Lake, NJ (US)

( * ) Notice: Subject to any disclaimer, the term of this patent is extended or adjusted under 35 U.S.C. 154(b) by 0 days.

(21) Appl. No.: 17/497,419

(22) Filed: Oct. 8, 2021

(65) Prior Publication Data
US 2022/0029279 A1 Jan. 27, 2022

Related U.S. Application Data

(63) Continuation of application No. PCT/CN2019/104822, filed on Sep. 9, 2019.

(51) Int. Cl.
*H01Q 1/36* (2006.01)
*H01Q 19/10* (2006.01)
(Continued)

(52) U.S. Cl.
CPC ............... *H01Q 1/36* (2013.01); *H01Q 19/10* (2013.01); *H01Q 21/06* (2013.01); *H01Q 21/062* (2013.01); *H01Q 21/26* (2013.01)

(58) Field of Classification Search
CPC .......... H01Q 1/36; H01Q 19/10; H01Q 21/06; H01Q 21/062; H01Q 21/26
(Continued)

(56) References Cited

U.S. PATENT DOCUMENTS 6,034,649 A * 3/2000 Wilson ................ H01Q 9/28
343/797
6,067,053 A * 5/2000 Runyon ............... H01Q 1/246
343/700 MS
(Continued)

FOREIGN PATENT DOCUMENTS

CN 102176536 A 9/2011
CN 202585746 U 12/2012
(Continued)

OTHER PUBLICATIONS

The World Intellectual Property Organization (WIPO) International Search Report for PCT/CN2019/104822 dated May 29, 2020 6 Pages (including translation).

*Primary Examiner* — Hai V Tran
(74) *Attorney, Agent, or Firm* — Anova Law Group, PLLC

(57) ABSTRACT

A high-gain miniaturized antenna element includes a radiation structure and a feed support structure. The radiation structure includes a first radiator and a second radiator. The first radiator is arranged horizontally. The second radiator is formed by bending an outer edge of the first radiator downwardly. The feed support structure includes a plurality of feed support parts arranged vertically. Each feed support part is a downward extension of the first radiator.

16 Claims, 4 Drawing Sheets

(51) Int. Cl.
*H01Q 21/06* (2006.01)
*H01Q 21/26* (2006.01)

(58) Field of Classification Search
USPC .......................................................... 343/824
See application file for complete search history.

(56) References Cited

U.S. PATENT DOCUMENTS

| | | | |
|---|---|---|---|
| 7,173,572 B2* | 2/2007 | Teillet | H01Q 1/246 |
| | | | 343/795 |
| 7,688,271 B2* | 3/2010 | Cao | H01Q 9/285 |
| | | | 343/797 |
| 2010/0321251 A1 | 12/2010 | Hesselbarth | |
| 2011/0012788 A1* | 1/2011 | Rowell | H01Q 9/0428 |
| | | | 343/700 MS |
| 2019/0312362 A1* | 10/2019 | Quitt | H01Q 1/241 |

FOREIGN PATENT DOCUMENTS

| | | |
|---|---|---|
| CN | 202695707 U | 1/2013 |
| CN | 104900987 A | 9/2015 |
| CN | 107508036 A | 12/2017 |
| CN | 110048211 A | 7/2019 |
| CN | 209183717 U | 7/2019 |
| WO | 2018072827 A1 | 4/2018 |

* cited by examiner

HIGH-GAIN MINIATURIZED ANTENNA ELEMENT AND ANTENNA

CROSS-REFERENCE TO RELATED APPLICATION

This application is a continuation application of PCT application PCT/CN2019/104822, filed on Sep. 9, 2019, the entire content of which is incorporated herein by reference.

TECHNICAL FIELD

The present disclosure generally relates to the 5G communication technology field, and more particularly, to a high-gain miniaturized antenna element and an antenna.

BACKGROUND

With the development of the mobile internet and the internet of things (TOT), the network speed, network capacity, number of terminal connections, and air interface delay of the 4G mobile communication system no longer satisfy the needs of the market and technology evolution. In the future, the 5G technology with a wider bandwidth, a higher speed, lower power consumption, a shorter delay, and denser and more secure connections is required. Application scenarios of a 5G base station are diversified. Many scenarios have higher and higher requirements on a structural size of an antenna element of the 5G base station. Therefore, how to design a high-gain miniaturized element antenna is a challenge in designing a 5G base station antenna system.

However, in existing technologies, an antenna element is mostly a dipole antenna and is provided with a radiation surface on a circuit board. Such a 5G element unit based on a plate structure has a relatively high cost and a relatively heavyweight. In addition, an 5G antenna element in existing technologies occupies a large space and is not beneficial to miniaturize the base station antenna. The loss of the antenna element is also large.

SUMMARY

Embodiments of the present disclosure provide a high-gain miniaturized antenna element, including a radiation structure and a feed support structure. The radiation structure includes a first radiator and a second radiator. The first radiator is arranged horizontally. The second radiator is formed by bending an outer edge of the first radiator downwardly. The feed support structure includes a plurality of feed support parts arranged vertically. Each feed support part is a downward extension of the first radiator.

Embodiments of the present disclosure provide an antenna including a substrate and an antenna element arranged at the substrate. The antenna element includes a radiation structure and a feed support structure. The radiation structure includes a first radiator and a second radiator. The first radiator is arranged horizontally. The second radiator is formed by bending an outer edge of the first radiator downwardly. The feed support structure includes a plurality of feed support parts arranged vertically. Each feed support part is a downward extension of the first radiator.

REFERENCE NUMERALS

100 antenna element, 10 radiation structure, 11 first radiator, 12 second radiator, 121 first side, 122 second side, 13 gap, 14 slot, 141 first slot, 142 second slot, 15 radiation unit, 151 first radiation part, 152 second radiation part, 20 feed support structure, 21 feed support part, 200 antenna, 30 substrate, 31 feed network, 311 signal input/output terminal, 40 isolation board.

DETAILED DESCRIPTION OF THE EMBODIMENTS

Embodiments of the present disclosure are described in detail in connection with the accompanying drawings of the present disclosure.

A high-gain miniaturized antenna element and an antenna disclosed in the present disclosure may reduce the weight and cost of the antenna element, make the antenna element occupy a smaller space, miniaturize the base station antenna, reduce the loss of the antenna element and improve the assembly and application of the antennas in the 5G communication frequency band.

Figure 1:
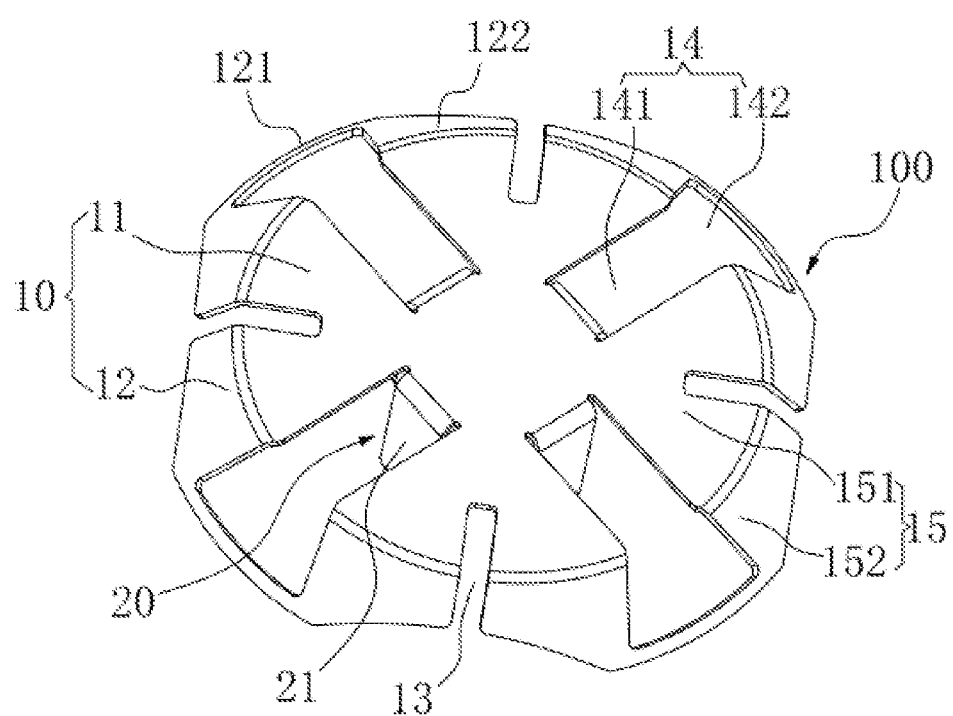
FIG. 1 is a perspective structural diagram of an antenna element according to some embodiments of the present disclosure.
Figure 2:
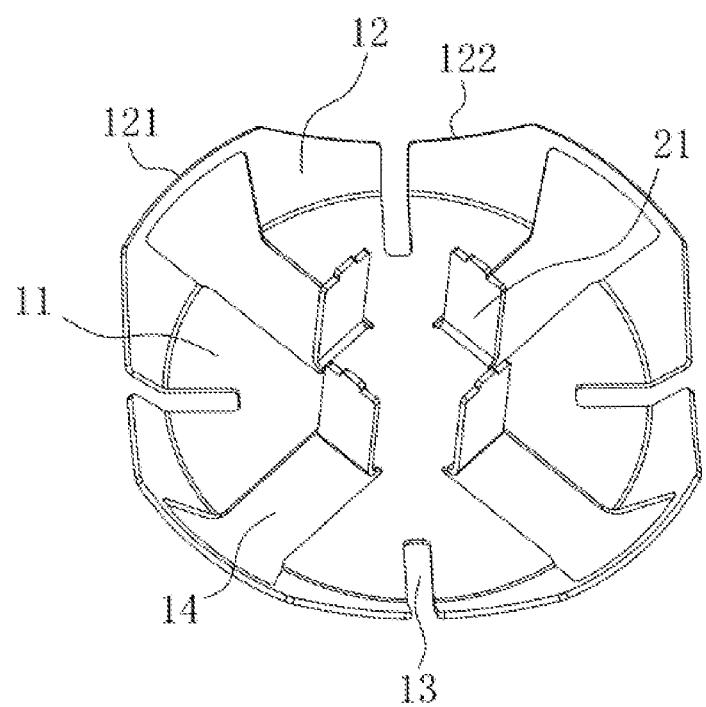
FIG. 2 is a perspective structural diagram showing an opposite side of the antenna element in FIG. 1.

As shown in FIG. 1 and FIG. 2, the present disclosure provides a high-gain miniaturized antenna element 100. The high-gain miniaturized antenna element 100 includes a radiation structure 10 and a feed support structure 20. The radiation structure 10 includes a first radiator 11 and a second radiator 12. The first radiator 11 is a main portion of the radiation structure 10 that radiates signals and generates an antenna pattern of the antenna element 100. In some embodiments, the first radiator is arranged horizontally and has a disc-shape overall, and the shape of the first radiator may not be limited to the disc-shape.

The second radiator 12 and the first radiator 11 form the radiation portion of the antenna. In some embodiments, the second radiator 12 is formed by bending an outer edge of the first radiator 11 downwardly, which is approximately a skirt structure of the first radiator 11.

In some embodiments, the radiation structure 10 further includes a plurality of gaps 13. The plurality of gaps 13 may be configured to effectively adjust a resonant frequency of the antenna element 100 and reduce the size of the antenna element 100. Each gap 13 extends from the outer edge of the second radiator 12 to the center of the first radiator 11 and passes through the outer edge of the second radiator 12. In some embodiments, the plurality of gaps 13 extend to the first radiator 11, that is, each gap 13 is formed at the second radiator 12 and the first radiator 11. In some embodiments, four gaps 13 are arranged at the radiation structure 10. The four gaps 13 are evenly distributed in a circumferential direction of the radiation structure 10 and face the center of the first radiator 11 (the center of the first radiator). That is, the four gaps 13 are rotationally symmetrical at the radiation structure 10.

The plurality of gaps 13 divide the radiation structure 10 into a plurality of radiation units 15. In some embodiments, the four gaps 13 divide the radiation structure 10 into four radiation units 15. That is, a radiation unit 15 is formed between two adjacent gaps 13 of the radiation structure 10. The four radiation units 15 form two radiation unit sets. A symmetrical axis of one of the two radiation unit sets is perpendicular to a symmetrical axis of the other one of the two radiation unit sets. Each radiation unit set includes two radiation units 15 arranged oppositely. That is, the four radiating units 15 are distributed in a crisscross.

In some embodiments, the structures of the four radiation units 15 are same. Each radiation unit 15 includes a first radiation part 151 and a second radiation member 152. The first radiation part 151 may be arranged horizontally and may be a portion of the first radiator 11. The second radiation part 152 may is formed by bending from the outer edge of the first radiator part 151 downwardly. The second radiation part 152 may be a portion of the second radiator 12. In some embodiments, the number, shape, etc. of the gaps 13 at the radiation structure 10 may not be limited. Correspondingly, the number, shape, etc. of the radiation unit 15 may not be limited.

The outer edge of each radiation unit 15 is a polygon, i.e., the outer edge of the second radiation part 152 is a polygon including a plurality of first sides 121 and second sides 122 spaced apart. In some embodiments, each radiation unit 15 includes a first side 121 and two second sides 122. As such, the entire outer edge of the second radiator 12 includes four first sides 121 and eight second sides 122. The first side 121 may include an exact arc shape or an approximate arc shape. The second side 122 may be an arc that is curved in an opposite direction to the first side, that is, the curved directions of the first side 121 and the second side 122 are opposite. For example, if the first side 121 may include a circular arc that is curved outward, the second side 122 may include a circular arc that is curved inward. The skirt structure of the second radiator 12 may reduce an aperture size of the antenna element while ensuring the resonance frequency, which is beneficial for the miniaturization. In some embodiments, the number of sides of each radiation unit 15 may be set according to actual needs, and the shapes of the first side 121 and the second side 122 are not limited to those defined here.

In some embodiments, the radiation structure 10 further includes a plurality of slots 14. By arranging the plurality of slots at the radiation structure 10, the weight of the antenna element 100 may be effectively reduced, and the miniaturization, matching, and welding of the antenna element 100 may be beneficial to achieve. In some embodiments, each slot 14 includes a first slot 141 formed at the first radiator 11 and a second slot 142 formed at the second radiator 12. In some embodiments, each radiation unit 15 may provide a slot 14, i.e., four slots 14 are formed at the radiation structure 10. Each slot 14 is arranged coaxially with the corresponding radiation unit 15, i.e., the four slots 14 may also be distributed in a crisscross.

In addition, in some embodiments, the first slot 141 is a rectangle slot. The second slot 142 is or is approximately a sector slot. The rectangle slot facilitates the miniaturization of the antenna element, and the sector slot facilitates the effective reduction of the weight of the antenna element 100 and the matching and welding of the antenna element 100. In some embodiments, the number and shape of the slots 14 of the radiation structure 10 may also not be limited.

The feed support structure 20 is formed extending from the first radiator 11 downwardly. In other words, the fees support structure 20 is a downward extension of the first radiator 11. On one hand, the feeding support structure 20 may function to feed power. On the other hand, the feed support structure 20 may function to support and fix the antenna element 100. In some embodiments, the feed support structure 20 may include a plurality of feed support parts 21 arranged vertically. Each feed support part 21 may be formed by tearing or punching the radiation structure and then bending. After bending, one slot may be formed at the radiation structure. In some embodiments, the feed support structure 20 includes four feed support parts 21 arranged vertically. Each feed support part 21 may be connected to the first radiator 11 and arranged close to the center of the first radiator 11. Each radiation unit 15 may correspond to a feed support part 21. One end (an upper end) of each feed support part 21 is connected to an end of the first slot 141 away from the outer edge of the first radiator 14. The four feed support parts 21 are also distributed in a crisscross. In some embodiments, the number and location of the feed support parts 21 is not limited.

In some embodiments, the antenna element 100 of the present disclosure may be designed and formed integrally, which may effectively increase the strength of the antenna. By using a sheet metal structure, the antenna element may be easy to manufacture, and the entire weight of the antenna may be reduced.

In addition, the antenna element 100 may further include a director (not shown). In some embodiments, the director may be fixed above the radiation structure 10. Specifically, the director may be arranged above an end face of the radiation structure 10 away from the feed support part. On one hand, by arranging the director, the element may be better matched in the case where the height of the element is smaller than the height of the traditional element. On another hand, by arranging the director, the cross polarization of the antenna may be improved.

Figure 3:
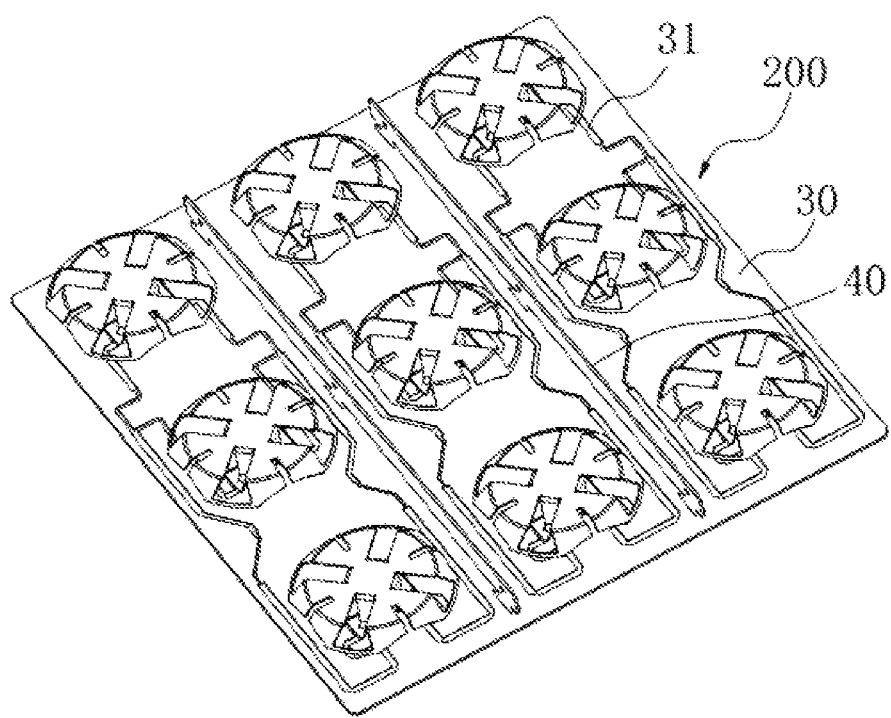
FIG. 3 is a perspective structural diagram of an antenna according to some embodiments of the present disclosure.
Figure 4:
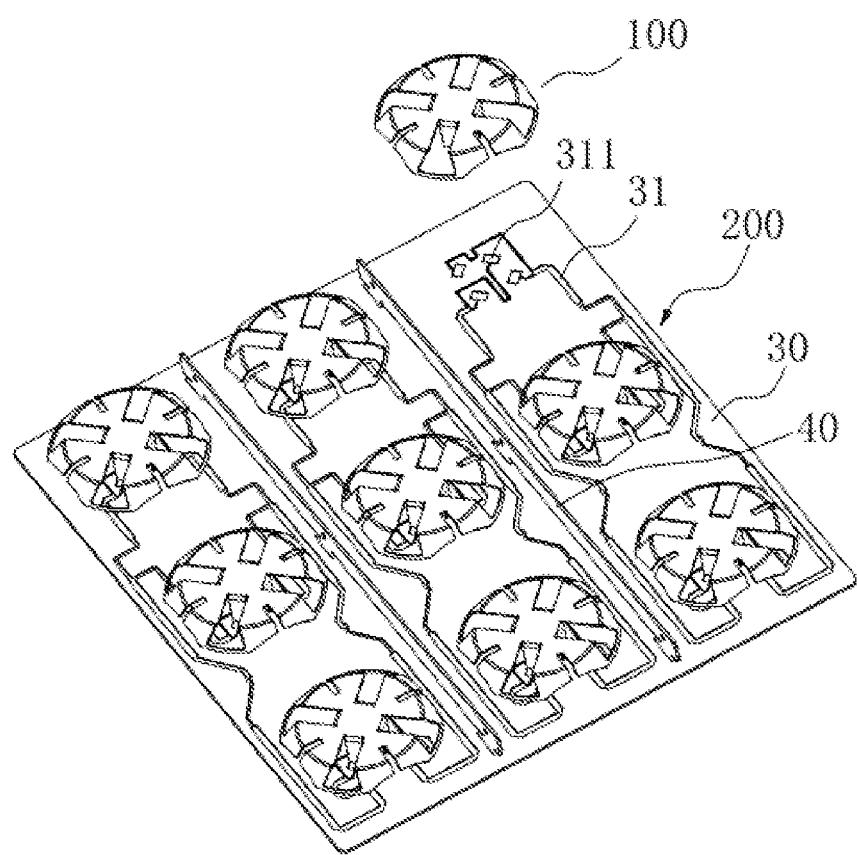
FIG. 4 is a schematic structural diagram showing the antenna element and the substrate in FIG. 3 separated from each other.

As shown in FIG. 3 and FIG. 4, the present disclosure discloses an antenna 200. The antenna 200 includes a substrate 30 and at least an element unit arranged at the substrate 30. Each element unit may include at least one antenna element 100. Another end (a lower end) of the feed support part 21 of the antenna element may be connected to the substrate 30. In some embodiments, the other end of the feed support part 21 may be welded to the substrate 30. In some embodiments, the substrate 30 includes a feed network 31. The feed network 31 includes a plurality of signal input/output terminals 311. The other end of each feed support part 21 may be electrically connected to the signal input/output terminal 311 correspondingly. In some embodiments, the substrate 30 may be a printed circuit board (PCB) or include a PCB.

In some embodiments, an isolation board 40 may be arranged between two neighboring element units, which may improve the isolation between the element units and reduce the side lobe of the antenna radiation pattern.

The present disclosure includes the following beneficial effects.

1. The integral design of the antenna element may effectively enhance the strength of the element. The antenna element includes the sheet metal structure. Thus, the antenna element may be easy to manufacture, and the whole weight of the antenna may be reduced.

2. The radiation portion of the antenna includes the skirt structure bent outwards, which may reduce the aperture size of the antenna element while ensuring the resonance frequency, which may be beneficial for miniaturization. The plurality of slots in the radiation portion may not only effectively reduce the weight of the element, but also facilitate the miniaturization, matching, and welding of the antenna element. Thus, the base station antenna may achieve high gain and miniaturization, while the loss of the antenna unit may be reduced, which facilitates the assembly and use of the antenna in the 5G communication frequency band.

3. The plurality of feed support parts arranged vertically not only feed power, but also support and fix the element unit.

4. With the structure of the radiation portion with the plurality of gaps, the resonant frequency of the element may be effectively adjusted, the size of the element may be reduced, and the weight of the element may be effectively reduced.

The technical content and the technical feature of the present disclosure are explained above. However, those of skill in the art can still make replacements and modifications without departing from the spirit of the present disclosure based on teachings and disclosure of the present invention. Therefore, the scope of the present invention should not be limited to the content disclosed by embodiments but should include various replacements and modifications without departing from the present invention and are subject to the scope of the claims.

What is claimed is:

1. A high-gain miniaturized antenna element comprising:
a radiation structure including:
    a first radiator arranged horizontally;
    a second radiator formed by bending an outer edge of the first radiator along a radial direction of the radiator and extending from the outer edge of the first radiator downwardly; and
    a plurality of gaps, each gap extends from an outer edge of the second radiator in a direction of a center of the first radiator and passes through the outer edge of the second radiator, wherein:
        the plurality of gaps divide the radiation structure into a plurality of first radiation parts and a plurality of second radiation parts, the plurality of first radiation parts being parts of the first radiator, and the plurality of the second radiation parts being parts of the second radiator; and
        an outer rim of one of the plurality of second radiation parts includes a first side and two second sides spaced apart; and
a feed support structure including:
    a plurality of feed support parts arranged vertically, each feed support part being a downward extension of the first radiator.

2. The antenna element of claim 1, wherein the antenna element is a sheet metal structure.

3. The antenna element of claim 1, wherein:
the first side includes an arc; and
a second side includes an arc curved opposite to the first side.

4. The antenna element of claim 1, wherein:
the feed support part is formed by tearing or punching and then bending the radiation structure; and
the radiation structure further includes a slot after being bent.

5. The antenna element of claim 4, wherein:
the slot includes a first slot at the first radiator and a second slot at the second radiator;
the first slot is a rectangle slot; and
the second slot is or is approximately a sector slot.

6. The antenna element of claim 5, wherein the feed support part is connected to an end of the first slot away from the outer edge of the first radiator.

7. The antenna element of claim 1, wherein:
the radiation structure and the feed support structure are integrally formed.

8. The antenna element of claim 1, wherein the feed support structure includes more than two feed support parts that are connected to more than two feed power lines, each of the feed support parts corresponding to one of the feed power lines.

9. An antenna comprising:
a substrate;
an antenna element arranged at the substrate including:
    a radiation structure including:
        a first radiator arranged horizontally;
        a second radiator formed by bending an outer edge of the first radiator along a radial direction of the radiator and extending from the outer edge of the first radiator downwardly; and
        a plurality of gaps, each gap extends from an outer edge of the second radiator in a direction of a center of the first radiator and passes through the outer edge of the second radiator, wherein:
            the plurality of gaps divide the radiation structure into a plurality of first radiation parts and a plurality of second radiation parts, the plurality of first radiation parts being parts of the first radiator, and the plurality of the second radiation parts being parts of the second radiator; and
            an outer rim of one of the plurality of second radiation parts includes a first side and two second sides spaced apart; and
    a feed support structure including:
        a plurality of feed support parts arranged vertically, each feed support part being a downward extension of the first radiator.

10. The antenna of claim 9, wherein the antenna element is a sheet metal structure.

11. The antenna of claim 9, wherein:
the first side includes an arc; and
a second side includes an arc curved opposite to the first side.

12. The antenna of claim 9, wherein:
the feed support part is formed by tearing or punching and then bending the radiation structure; and
the radiation structure further includes a slot after being bent.

13. The antenna of claim 12, wherein:
the slot includes a first slot at the first radiator and a second slot at the second radiator;
the first slot is a rectangle slot; and
the second slot is or is approximately a sector slot.

14. The antenna of claim 13, wherein the feed support part is connected to an end of the first slot away from the outer edge of the first radiator.

15. The antenna of claim 9, further comprising:
a director fixed above the radiation structure.

16. The antenna of claim 9, wherein:
the radiation structure and the feed support structure are integrally formed.

* * * * *